United States Patent [19]

Betts et al.

[11] Patent Number: 4,633,485
[45] Date of Patent: Dec. 30, 1986

[54] ADAPTIVE NOISE SUPPRESSION FOR DIGITAL MODEMS

[75] Inventors: William L. Betts, St. Petersburg; Edward Zuranski, Largo, both of Fla.

[73] Assignee: Paradyne Corporation, Largo, Fla.

[21] Appl. No.: 709,562

[22] Filed: Mar. 8, 1985

[51] Int. Cl.[4] .......................... H03D 1/04; H04B 1/10; H04L 7/00

[52] U.S. Cl. ...................... 375/99; 375/103; 375/118

[58] Field of Search .................... 375/90, 99, 103, 118

[56] References Cited

U.S. PATENT DOCUMENTS 4,320,526  3/1982  Gitlin ................................. 375/118
4,514,855  4/1985  Lang et al. ........................ 375/118
4,532,640  7/1985  Bremer et al. .................... 375/120
4,534,036  8/1985  Betts et al. ....................... 375/120

Primary Examiner—Douglas W. Olms
Assistant Examiner—Frank M. Scutch, III
Attorney, Agent, or Firm—Kane, Dalsimer, Kane, Sullivan & Kurucz

[57] ABSTRACT

This invention provides a receiver for a QAM modem with a phase tracking loop for eliminating phase errors due to phase jitter and frequency offset. The instantaneous phase error of the received signal is monitored and if it is below a certain preselected value, indicating the presence of white noise, the gain of the phase tracking loop is reduced.

2 Claims, 4 Drawing Figures

ADAPTIVE NOISE SUPPRESSION FOR DIGITAL MODEMS

BACKGROUND OF THE INVENTION

1. Field of the Invention

The present invention relates to modems using QAM modulation techniques and in particular to a circuit for selectively eliminating phase jitter in the absence of white noise.

2. Description of the Prior Art

Phase jitter and frequency offset are two line impairments which have a detrimental effect on the incoming signal in a digital modem receiver. To prevent these impairments from causing errors in the demodulated modem signal a phase tracking loop may be utilized, as disclosed in the commonly assigned co-pending application entitled Phase Tracking Loop for Digital Modem, Ser. No. 407,451, filed on Aug. 12, 1982 now U.S. Pat. No. 4,532,640 granted on July 30, 1985, and incorporated herein by reference. The phase tracking loop was found to be very effective with respect to frequency offset and low frequency, low amplitude phase jitter while high amplitude phase jitter sometimes cannot be tracked out by the phase tracking loop.

Therefore, in co-pending, commonly assigned patent application entitled Phase Tracking Loop Impairment Monitor for Modems, Ser. No. 447,989, filed Dec. 8, 1982, now U.S. Pat. No. 4,534,036, granted on Aug. 6, 1985, and incorporated herein by reference, a device is described in which a corrected phase error signal, an uncorrected phase error and a total phase error signal is derived from the instantaneous phase error signal generated by a phase tracking loop, for monitoring purposes.

The phase tracking loop described hereinabove essentially eliminated long term tangential errors in the received signals. However, data transmission channels are also subject to error signals which do not have a long-term detrimental effect on the phase of the incoming signals. One such type of signal is white noise, which has an instantaneous radial and tangential component. The phase tracking loop normally compensates for the tangential component of the noise signal thereby degrading the performance of the receiver.

OBJECTIVES AND SUMMARY OF THE INVENTION

A primary objective of the invention is to provide a phase tracking circuit which eliminates errors due to phase jitter and frequency shifts but is substantially unaffected by white noise.

A further objective is to provide a device by modifying a prior art device, thereby reducing costs of design and implementation.

Still further objectives and advantages will be apparent from the following description of the invention.

The phase tracking loop described in the previously specified application comprises an instantaneous phase error signal generating portion, a frequency offset integrator, and a phase corrector. The phase error is fed to the frequency offset integrator which generates a signal proportional to the phase error due to the frequency offset. The output of the frequency offset integrator is added to the original phase error to provide an input to the phase corrector.

The tracking loop impairment monitor described in the previously specified application comprises a corrected phase error signal circuit (CPE) and an uncorrected phase error signal circuit (UPE). The UPE circuit averages the phase error signal. This average value represents the uncorrected high frequency phase error. The CPE circuit duplicates the function of the phase tracking circuit but without the frequency offset integrator. The output of the CPE represents the corrected phase jitter error. The output of the two circuits are added to form a total phase error signal.

The present invention monitors the corrected phase error signal generated by the phase track loop to detect the presence of phase jitter. It has been found that the corrected phase error signal increases in the presence of phase jitter but is unaffected by white noise. Therefore, if the corrected phase error signal is above a preselected threshold level, it is assumed that phase jitter is present in the received signal, and the phase tracking loop is operated at a relatively high gain. If the corrected phase error signal is below said threshold level, it is assumed that the phase error is the resultant of white noise and the phase tracking loop is operated at a very low gain level.

DETAILED DESCRIPTION OF THE PREFERRED EMBODIMENT

In order to insure a clear understanding of the invention a brief description of the tracking loop and tracking loop monitor is first presented. As previously stated, the tracking loop comprises a phase-error generating portion; a frequency offset integrator and a phase corrector.

Figure 1:
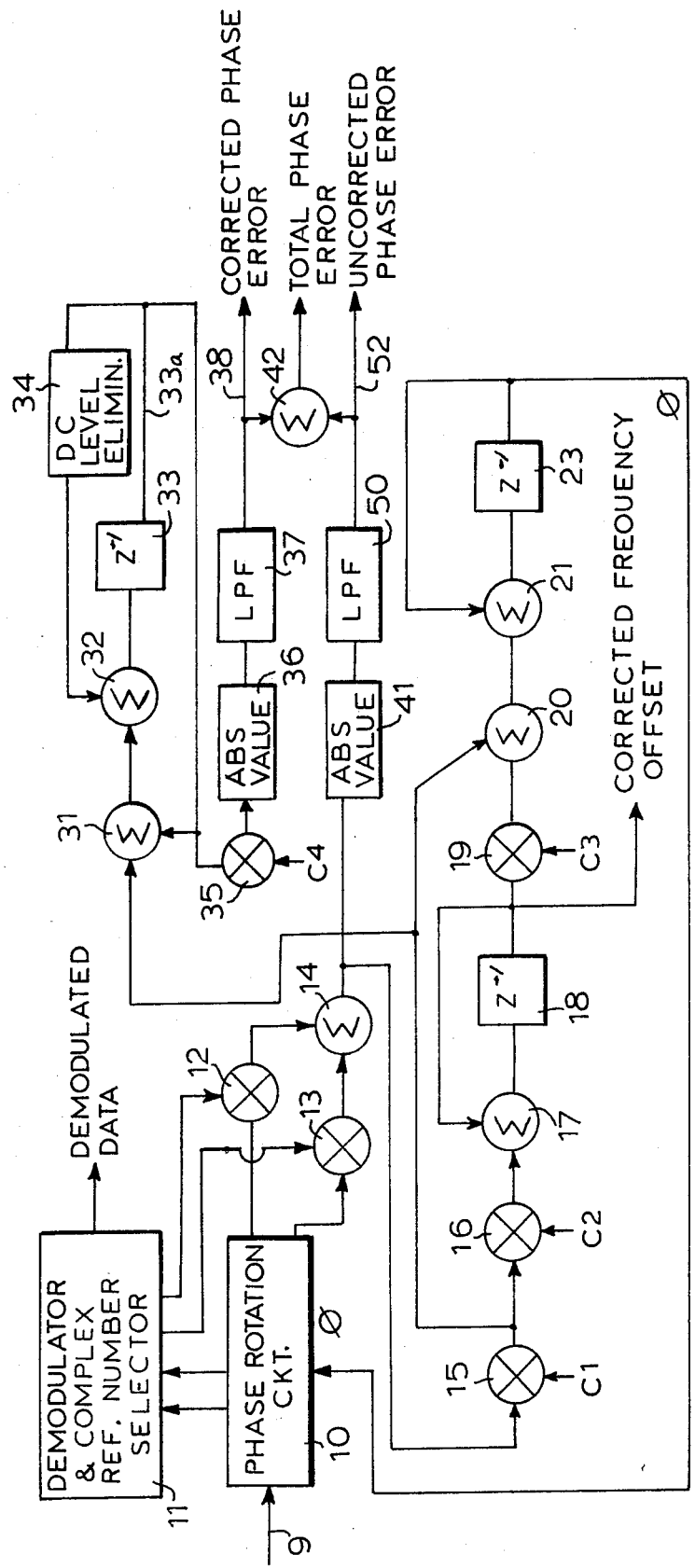
FIG. 1 is a block diagram for a phase tracking loop and the monitoring circuitry described in the present invention.
Figure 3:
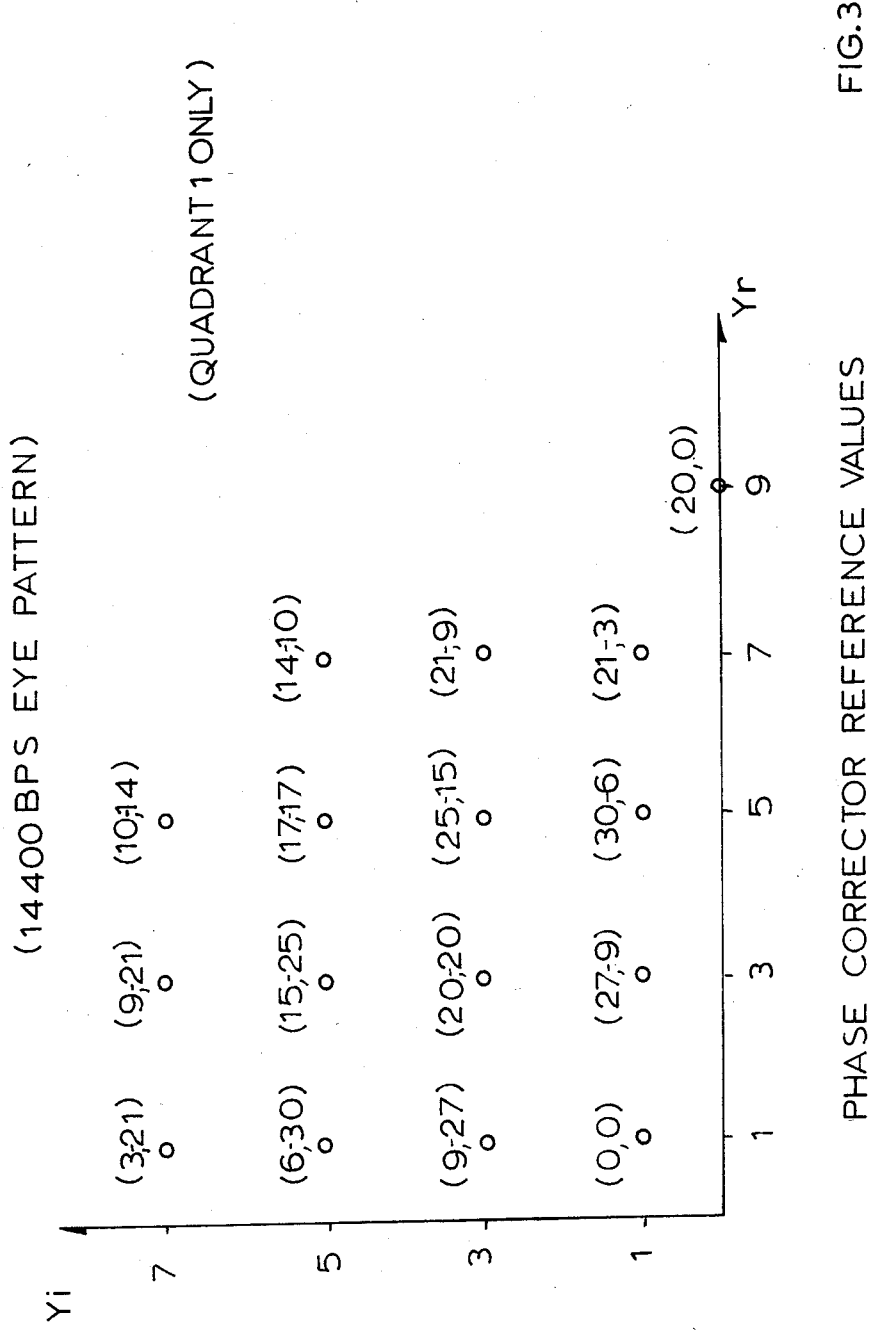
FIG. 3 shows the first quadrant of a typical signal constellation of received signals and the corresponding phase reference numbers.

The phase error generating portion consists (as shown in FIG. 1) of coordinate rotation circuit 10, demodulator and complex reference number selector circuit 11, multipliers 12, and 13, and adder 14. The coordinate rotation circuit 10, rotates the coordinates of the signals received by the modem on line 9 by the phase angle $\phi$ determined by the phase tracking loop. The rotated coordinates are transmitted in rectangular form to demodulator and phase reference selector circuit 11 which makes a decision as to which signal was probably sent based on the received rotated coordinates and generates demodulated data. Circuit 11 also generates a complex phase reference number corresponding to each received signal. The rotated coordinates of the received signal are cross-multiplied with the components of the complex phase reference number to obtain a tangential error component which is proportional to the instantaneous phase error. This complex arithmetic operation is performed by multipliers 12 and 13 and adder 14. In order to eliminate the effects of the radial amplitudes of the received signals, the complex phase reference numbers are chosen so that their radial amplitude decreases inversely with the radial components of the corresponding received signals. A typical signal constellation and the phase reference numbers corresponding to each received signal is shown in FIG. 3.

The output of adder 14 is the instantaneous phase error and it is multiplied in scaling multiplier 15 by a constant C1 and then fed into the frequency offset generator comprising multiplier 16, adder 17 and integrator 18. The multiplier 16 multiplies the phase error by a second constant C2. The output of the frequency offset generator is multiplied by third multiplier 19 with a scaling constant C3 and it represents the phase error caused by frequency offset. Both the phase error and the frequency offset output are then fed into adder 20 which then feeds the sum of the outputs of scaling multipliers 15 and 19 to the phase corrector formed by adder 21 and integrator 23. The output of the integrator 23 is an angle $\phi$ which is fed back into coordinate rotation circuit 10 and is used to rotate the coordinates of the signal received on line 9.

Initially, while the frequency offset generator is set to zero, the phase tracking loop is set at any arbitrary value. As the phase correction is initiated, this arbitrary value is rapidly forced to the phase error of the received signals.

As previously indicated, the phase tracking loop monitor comprises a section for generating a corrected phase error signal and a section for generating an uncorrected phase error signal. The uncorrected phase error section comprises an absolute value circuit 41 and low pass filter circuit 50. Together circuits 41 and 50 average and smooth out the phase error generated by adder 14 and the output 52 of 50 is proportional to the uncorrected phase error, i.e. the phase error due to the high frequency phase jitter which could not be tracked out by the loop.

The corrected phase error section comprises adders 31 and 32, integrator 33, multiplier 35, absolute value circuit 36, and low pass filter 37. The adder 31 and integrator 33 in effect duplicate the function of adder 17 and integrator 18 of the phase tracking loop, the only difference being that the effects of the frequency offset are being ignored. The resulting output 33a is proportional to the corrected phase error due to low frequency jitter. This output is multiplied by a scaling constant C4 by multiplier 35 and averaged by absolute value circuit 36 and low pass filter 37, to yield a final output 38 which is the corrected phase error signal. The two outputs 38 and 52 are added by adder 42 to generate a total phase error signal.

As previously indicated, initially integrator 23 of the phase tracking loop outputs an arbitrary phase angle. This arbitrary phase angle has the effect of causing a D.C. level in the output of integrator 33, of the corrected phase error circuit. D.C. level eliminator 34 is provided to eliminate this effect by adding a number to the output of adder 31. The output of adder 32 becomes the input of integrator 33. More specifically, the D.C. eliminator feeds a "+1" to adder 32 if the output 33a of integrator 33 is negative, and "−1" if 33a is positive.

Figure 2:
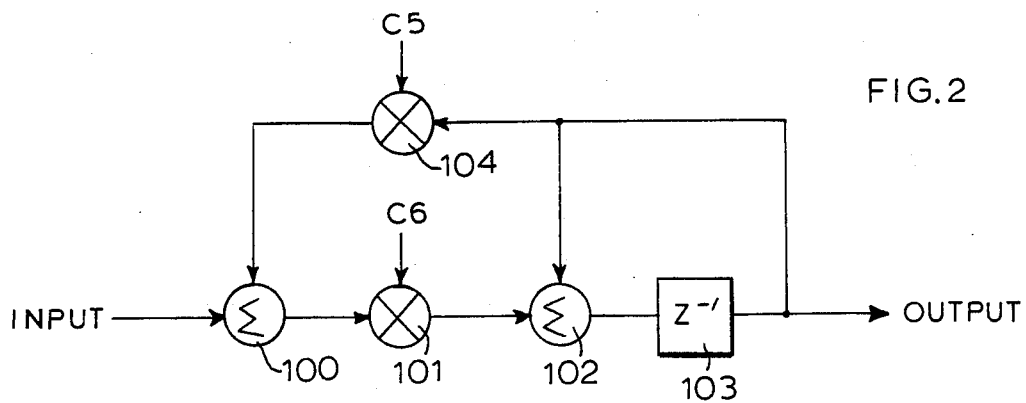
FIG. 2 shows the elements of a standard low pass filter.

Low pass filters such as 37 and 50 are well known in the art, and as shown in FIG. 2. They may comprise a first and second adder 100 and 102, and an integrator. The filter's input is fed to adder 100. The output of 100 is scaled by a multiplier 101 before it is fed into adder 102. The output of 102 is fed into integrator 103, and the output of the integrator is fed back into adder 102, and after scaling by multiplier 104, to adder 100.

Figure 4:
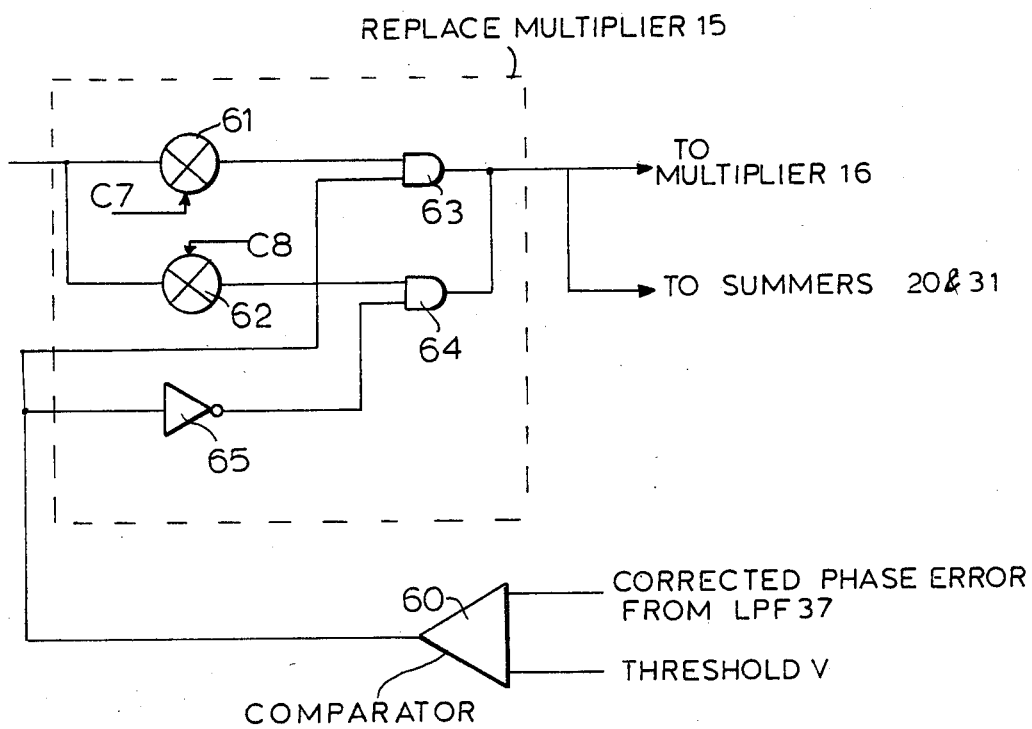
FIG. 4 shows the modifications made in the prior art by the present invention.

In the present invention, the function of multiplier 15 is replaced by the circuit shown in FIG. 4. First, the corrected phase error signal generated by low-pass filter 37 is fed to one of the inputs of a comparator 60. The other input of the comparator receives a threshold signal V. Comparator 60 generates a "1" if the corrected error signal exceeds the threshold V, and "0" otherwise. The instantaneous phase error signal from summer 14 is fed to two multipliers 61 and 62, which multiply said signal by constants C7 and C8, respectively. The outputs of the two multipliers comprise the inputs of two logic AND gates 63 and 64, respectively. The other input of gate 63 is connected to the output of the comparator. The output of the comparator is also fed to an inverter 65. The output of the inverter 65 comprises the second input of gate 64.

It is obvious that the circuit of FIG. 4 controls the gain of the phase tracking loop of FIG. 1 in accordance with the corrected error control signal. If the corrected error control signal is higher than threshold V, the comparator 60 enables AND gate 63 so that the loop gain is proportional to C7. If the corrected phase error signal is below threshold V, the comparator 60 enables AND gate 64 and the loop gain is proportional to C8. In order to insure that the loop gain is higher for phase jitter than for white noise C7 is made higher than C8. For example, C7 could be equal to 1.0 and C8 equal to 0.5.

The threshold value is preset and is selected in accordance with the expected RMS of the white noise in a particular location. If necessary, the threshold value may be set after the modem has been installed in a particular location and the RMS of the white noise has been determined from actual field measurements.

Obviously, numerous modifications may be made to the invention without departing from its scope as defined in the appended claims.

What is claimed is:

1. In the receiver section of a modem for receiving quadrature amplitude modulated (QAM) signals, a phase tracking loop comprising:
   coordinate rotation means for rotating said QAM signals to form rotated QAM signals by an average phase error signal;
   demodulator and complex reference number selector means for demodulating said rotated QAM signals and for selecting complex reference numbers corresponding to said rotated QAM signals;
   instantaneous phase error signal generating means for generating an instantaneous phase error signal corresponding to said rotated QAM signals and said complex reference numbers;
   multiplying means for multiplying said instantaneous phase error signal by a gain signal to produce a multiplied error signal;
   means for generating a corrected error signal by averaging said multiplied error signal;
   means for generating said gain signal including a comparator for comparing the corrected phase error signal to a preselected threshold value for varying said gain in accordance with said threshold; and
   averaging means of averaging said corrected error signal to generate said average phase error signal.

2. The phase tracking loop of claim 1 wherein said multiplying means comprises a first multiplier for multiplying said instantaneous phase error signal with a first preselected constant, a second multiplier for multiplying said instantaneous phase error signal with a second preselected constant and means for selecting one of said first and second multiplier outputs in accordance with the output of said comparator.

* * * * *